United States Patent [19]

Yoshimura

[11] Patent Number: 4,642,003
[45] Date of Patent: Feb. 10, 1987

[54] ROTARY CUTTING TOOL OF CEMENTED CARBIDE

[75] Inventor: Hironori Yoshimura, Tokyo, Japan

[73] Assignee: Mitsubishi Kinzoku Kabushiki Kaisha, Japan

[21] Appl. No.: 643,278

[22] Filed: Aug. 22, 1984

[30] Foreign Application Priority Data

Aug. 24, 1983 [JP] Japan .................... 58-130600

[51] Int. Cl.⁴ .................... B23C 51/16; B23P 15/34
[52] U.S. Cl. .................... 408/144; 76/108 T; 76/DIG. 2; 76/DIG. 11; 407/119; 408/226; 419/59
[58] Field of Search ............ 408/144, 226, 229, 713; 407/53, 54, 119, 32; 419/57, 59; 76/108 R, 108 A, DIG. 2, DIG. 11

[56] References Cited

U.S. PATENT DOCUMENTS

| 1,936,435 | 2/1931 | Kelley | 407/119 X |
| 1,982,422 | 1/1935 | Emmons | 407/119 X |
| 1,993,598 | 3/1935 | De Bats | 407/119 X |
| 4,008,976 | 2/1977 | Holzl | 76/108 T X |
| 4,028,100 | 6/1977 | Latva | 419/59 X |
| 4,050,840 | 9/1977 | Skingle | 408/144 |
| 4,097,275 | 6/1978 | Horvath | 419/59 X |
| 4,436,696 | 3/1984 | Buck et al. | 419/59 X |

FOREIGN PATENT DOCUMENTS

| 83842 | 7/1983 | European Pat. Off. | 419/14 |
| 54543 | 4/1980 | Japan | 407/119 |
| 125913 | 9/1980 | Japan | 408/144 |
| 125917 | 9/1980 | Japan | 407/119 |
| 21711 | 2/1981 | Japan | 408/144 |
| 177167 | 9/1985 | Japan | 76/108 R |
| 526457 | 9/1976 | U.S.S.R. | 408/144 |

Primary Examiner—Gil Weidenfeld
Assistant Examiner—Glenn L. Webb
Attorney, Agent, or Firm—Darby & Darby

[57] ABSTRACT

A rotary cutting tool for processing a metal workpiece includes an elongated solid body composed of cemented carbide containing cobalt. The body has cutting edge means at its forward end and an axis of rotation therethrough. The body has a surface of which cobalt content is greater than that of the remainder of the body. Part of the surface of the body is ground to remove the cobalt-rich surface therefrom.

6 Claims, 6 Drawing Figures

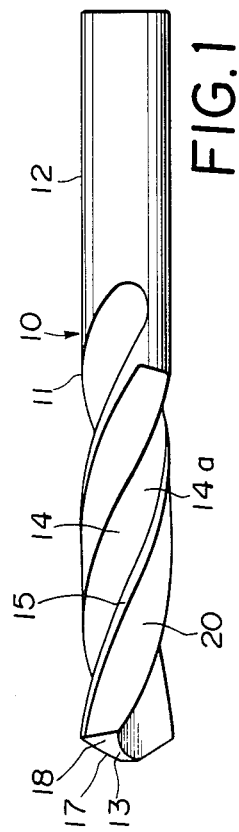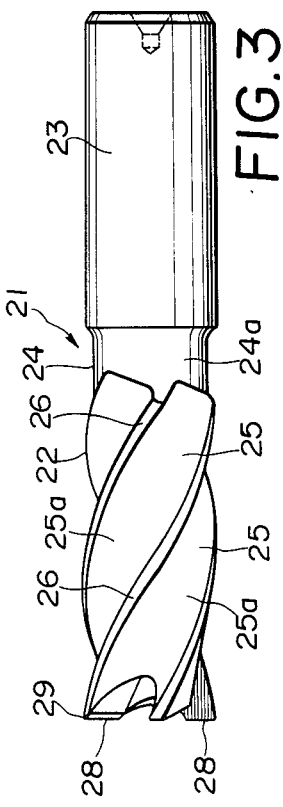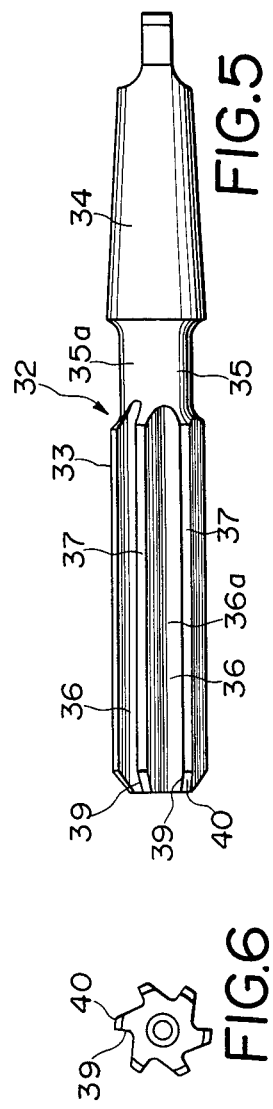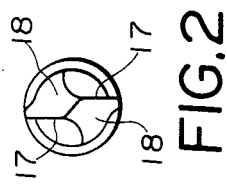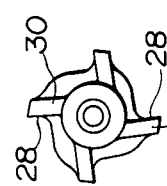

ROTARY CUTTING TOOL OF CEMENTED CARBIDE

BACKGROUND OF THE INVENTION

1. Field of the Invention

This invention relates generally to rotary cutting tools of cemented carbide such as a drill, an end mill and a reamer and more particularly to such cutting tools in which part of the surface is ground to provide a finish tool.

2. Prior Art

Generally, a drill of cemented carbide with a partially-ground finish surface can be manufactured at lower costs in comparison with a drill of cemented carbide having an entirely-ground finish surface since the former naturally requires less labor and time for the grinding operation. In addition, it is rather difficult to grind such a hard cemented carbide, and therefore the drill with the partially-ground surface is quite advantageous in this respect.

Generally, the cemented carbide of which the drill or the like is made contains cobalt as a binder. In the manufacture of such a drill, when a compacted powder mixture is sintered under vacuum, a sintered surface is formed on the drill body. This surface has a less cobalt content than the remainder of the drill body. The reason is that the cobalt content of the surface is reduced during the sintering. Generally, the drill is grounded at relief surfaces, margins and a shank portion where a sufficient toughness is required for the drilling operation. The remainder of the drill surface, that is, the non-ground portion, is defined by the above-mentioned surface. This surface having a less cobalt content is less tough, and therefore such a partially-ground drill is more liable to damage or breakage in comparison with the entirely-ground drill from which the surface having a less cobalt content is fully removed by grinding. In addition, the non-ground portion of the drill has naturally a greater surface roughness than the ground portion, and this aggravates the problem of breakage of the drill.

SUMMARY OF THE INVENTION

It is therefore an object of this invention to provide a partially-ground rotary cutting tool of cemented carbide in which that portion of the surface of the tool body defining the non-ground surface of the tool body has a greater cobalt content than the remainder of the tool body to enhance the toughness of the surface, thereby preventing the breakage of the cutting tool.

According to the present invention, there is provided a rotary cutting tool for processing a metal workpiece which comprises an elongated solid body composed of cemented carbide containing cobalt, the body having cutting edge means at its forward end and an axis of rotation therethrough, the body having a surface of which cobalt content is greater than that of the remainder of the body, and part of the surface of the body being defined by a ground surface from which the cobalt-rich surface is removed.

Starting powder materials of the cemented carbide are mixed together to form a powder mixture. The powder mixture is then compacted into a densified body. The densified body is then sintered in a carburizing atmosphere to form the tool body so that the cobalt-rich surface is formed on the sintered tool body. Then, the part of the surface of the tool body is ground to remove the cobalt-rich surface therefrom.

Preferably, the cobalt content of the surface should be 1.2 to 3 times greater than that of the remainder or interior of the tool body.

Those portions of the tool body where a sufficient hardness is required for the cutting operation must be ground to remove the cobalt-rich surface therefrom. The reason is that when the cobalt content is increased, the hardness is lowered although the toughness is increased. Also, it will be appreciated that those portions of the tool body where a close dimensional tolerance is required must be ground to remove the cobalt-rich surface therefrom.

BRIEF DESCRIPTION OF THE DRAWINGS

FIG. 1 is a side-elevational view of a twist drill provided according to the present invention;

FIG. 2 is an end view of the twist drill;

FIG. 3 is a side-elevational view of an end mill provided according to the present invention;

FIG. 4 is an end view of the end mill;

FIG. 5 is a side-elevational view of a reamer provided in accordance with the present invention; and FIG. 6 is an end view of the reamer.

DESCRIPTION OF THE PREFERRED EMBODIMENTS OF THE INVENTION

FIGS. 1 and 2 show a two-flute twist drill 10 which comprises an elongated solid body 11 of cemented carbide having a shank portion 12 adapted to be held in a chuck and an end face 13 at its forward end remote from the shank portion 12. A pair of helical grooves or flutes 14 are formed in and extend along the drill body 11. The drill body 11 has a pair of margins 15 extending along the flutes 14, respectively.

A pair of cutting edges 17 are formed on the forward end of the drill body 11, and a pair of relief surfaces 18 are formed on the end face 13 of the drill body 11. The relief surface 18 and that portion of a surface 14a of the flutes 14 disposed adjacent to the end face 13 cooperate with each other to define the cutting edge 17 in a well known manner.

For manufacturing the drill 10 of cemented carbide containing cobalt as a binder, starting powder materials of the cemented carbide are mixed together to form a powder mixture which is compacted into a densified body. The densified body is then sintered in a carburizing atmosphere to form the drill body 11. During the sintering in the carburizing atmosphere, the carbon diffuses into the densified body so that the cobalt diffuses into the surface of the densified body to form the cobalt-rich surface. The relief surfaces 18, the margins 15 and the shank portion 12 are ground to remove the cobalt-rich surface therefrom. The surfaces 14a of the flutes 14 and clearance surfaces 20 extending along the respective flutes 14 remain intact and therefore are defined by the cobalt-rich surface.

The drill 10 of cemented carbide was prepared according to the following procedure:

88% by weight of tungsten carbide (WC) and 12% by weight of cobalt (Co), both of which were in the form of powder, were mixed together to form a powder mixture. Then, the powder mixture was compacted into a densified body. Then, the densified body was sintered at 1400° C. for one hour in a carburizing atmosphere, with a partial pressure of $CH_4$ being at 1 torr, to form a drill body 11 having a surface. The cobalt content of the surface was 18% by weight.

FIGS. 3 and 4 show a four-flute end mill 21 which comprises an elongated solid body 22 of cemented carbide having a shank portion 23 and a neck 24. Four helical flutes or grooves 25 are formed in and extend along the body 22. The body 22 has four lands 26 extend along the helical flutes 25. Four end cutting edges 28 are formed at a forward end of the body 22 remote from the shank portion 23, and four peripheral cutting edges 29 are also formed on the respective lands adjacent to the forward end. Four relief surfaces 30 for the respective end cutting edges 28 are also formed at the forward end.

The end mill 21 of cemented carbide is produced according to the procedure described above for the twist drill 10, so that a cobalt-rich surface is formed on the end mill 21 during the sintering. The relief surfaces 30, the lands 26 and the shank portion 23 are ground to remove the cobalt-rich surface therefrom. The surfaces 25a of the flutes 25 and the surface 24a of the neck 24 remain intact and therefore are defined by the cobalt-rich surface.

FIGS. 5 and 6 show a six-flute reamer 32 which comprises an elongated solid body 33 of cemented carbide having a shank portion 34 and a neck 35. Six straight flutes 36 are formed in and extend along the body 33. The body 33 has six lands 37 extending along the straight flutes 36, and the lands 37 are tapered at a forward end of the body 33 remote from the shank portion 34. Six cutting edges 39 are formed on the respective tapered portions of the lands 37. Six relief surfaces 40 for the respective cutting edges 39 are formed on the tapered portions of the lands.

The reamer 32 of cemented carbide is produced according to the procedure described above for the twist drill 10, so that a cobalt-rich surface is formed on the reamer 32 during the sintering. The relief surfaces 40, the lands 37 and the shank portion 34 are ground to remove the cobalt-rich surface therefrom. The surfaces 36a of the flutes 36 and the surface 35a of the neck 35 remain intact and therefore are defined by the cobalt-rich surface.

The drill 10, the end mill 21 and the reamer 32 may be composed of cemented carbide containing nickel as a binder and/or at least one compound selected from the group consisting of nitrides and oxides of metals in groups $IV_A$, $V_A$ and $VI_A$ of the periodic table.

While the rotary cutting tools according to the present invention have been specifically shown and described herein, the invention itself is not to be restricted to the exact showing of the drawings. For example, the shank portion may be made of steel or the like in which case the cutting tool body of cemented carbide is brazed to the steel shank portion.

What is claimed is:

1. A rotary cutting tool, which comprises:
an elongated solid body, the solid body being composed of cemented carbide and containing cobalt, the elongated body including an interior portion containing cobalt and an exterior surface, the exterior surface including a relatively cobalt-rich unground surface portion and relatively cobalt-poor ground surface portions, the cobalt-rich unground surface portion having a cobalt content that is greater than the cobalt content of the cobalt-poor ground surface portions and the cobalt content of the interior portion; the elongated body having opposite first and second ends and including a shank portion formed at the first end, a cutting portion formed at the second end and including a relief surface and a cutting edge formed on the relief surface, and an intermediate portion interposed between the first and second ends and having at least one flute formed therein and at least one land adjacent the flute, the cobalt-poor ground surface portions of the elongated body being situated at the shank portion, land and relief surface of the elongated body, the cobalt-rich unground surface portion of the elongated body being situated at the flute of the elongated body.

2. A rotary cutting tool according to claim 1, in which the cobalt content of the cobalt-rich unground surface portion of said body is 1.2 to 3 times greater than that of the interior portion of said body.

3. A rotary cutting tool according to claim 1, wherein the tool is formed as a twist drill having a plurality of helical flutes extending along said body, the cutting portion including a plurality of cutting edges and a plurality of relief surfaces for the respective cutting edges being formed at said second end, said body having a plurality of lands extending along the respective helical flutes, and said relief surfaces and said lands being defined by said ground surface portions.

4. A rotary cutting tool according to claim 1, wherein the tool is formed as an end mill having a plurality of helical flutes extending along said body, the cutting portion including a plurality of end cutting edges, a plurality of relief surfaces for the respective end cutting edges being formed at said second end, said body having a plurality of lands extending along the respective helical flutes, and the plurality of peripheral cutting edges being formed on the respective lands adjacent to said second end, and said relief surfaces and said lands being defined by said ground surface portions.

5. A rotary cutting tool according to claim 1, wherein the tool is formed as a reamer having a plurality of straight flutes extending along said body, the cutting portion including a plurality of cutting edges, said body having a plurality of lands extending along the respective flutes and a plurality of relief surfaces for the respective cutting edges being formed at said second end, and said relief surfaces and said lands being defined by said ground surface portions.

6. A method of forming a rotary cutting tool, which comprises the steps of:
mixing a starting powder material of cemented carbide containing cobalt together to form a powder mixture;
compacting said powder mixture into a densified body;
sintering the densified body in a carburizing atmosphere to form an elongated body having an exterior cobalt-rich surface; and
grinding portions of the exterior surface of the elongated body to remove the cobalt-rich surface therefrom to define a relatively cobalt-rich unground surface portion and relatively cobalt-poor ground surface portions, the cobalt-rich unground surface portion having a cobalt content that is greater than the cobalt content of the cobalt-poor ground surface portions, the elongated body having opposite first and second ends and including a shank portion formed at the first end, a cutting portion formed at the second end and including a relief surface and a cutting edge formed on the relief surface, and an intermediate portion interposed between the first and second ends and having at least one flute formed therein and at least one land adjacent the flute, the cobalt-poor ground surface portions of the elongated body being situated at the shank portion, land and relief surface of the elongated body, the cobalt-rich unground surface portion of the elongated body being situated at the flute of the elongated body.

* * * * *